(12) United States Patent
Sugiura et al.

(10) Patent No.: US 9,993,821 B2
(45) Date of Patent: Jun. 12, 2018

(54) SMALL SOLENOID VALVE (71) Applicant: TAKASAGO ELECTRIC, INC., Nagoya-shi, Aichi (JP)

(72) Inventors: Hiroyuki Sugiura, Nagoya (JP); Naoya Asai, Nagoya (JP)

(73) Assignee: TAKASAGO ELECTRIC, INC., Aichi (JP)

( * ) Notice: Subject to any disclaimer, the term of this patent is extended or adjusted under 35 U.S.C. 154(b) by 183 days.

(21) Appl. No.: 14/867,491

(22) Filed: Sep. 28, 2015

(65) Prior Publication Data

US 2016/0096177 A1 Apr. 7, 2016

(30) Foreign Application Priority Data

Oct. 2, 2014 (JP) .................................. 2014-204323

(51) Int. Cl.
*F16K 11/044* (2006.01)
*B01L 3/00* (2006.01)
(Continued)

(52) U.S. Cl.
CPC .............. *B01L 3/567* (2013.01); *F16K 1/42* (2013.01); *F16K 11/044* (2013.01);
(Continued)

(58) Field of Classification Search
CPC ................... Y10T 137/8667–137/8671; B01L 2200/0689; B01L 2300/123;
(Continued)

(56) References Cited

U.S. PATENT DOCUMENTS 4,074,700 A * 2/1978 Engle .................... B60T 8/3615
137/625.27
4,598,736 A * 7/1986 Chorkey ............. F16K 31/0606
137/270
(Continued)

FOREIGN PATENT DOCUMENTS

JP 3-32267 U 3/1928
JP 60-86880 U 6/1985
(Continued)

OTHER PUBLICATIONS

Notification of Reasons for Refusal for the Application No. 2014-204323 from Japan Patent Office dated May 1, 2017.

*Primary Examiner* — William McCalister
(74) *Attorney, Agent, or Firm* — Cheng Law Group, PLLC (57) ABSTRACT

For the present small solenoid valve, a stem is coupled to a solenoid plunger, and a valve body is attached to a distal end of the stem. A circular-ring shaped valve seat on which the valve body is seated is provided in a valve chamber of a valve casing, and a seal ring is externally fitted on the stem between the valve chamber and the solenoid plunger with an outer peripheral portion of the seal ring made to contact with an inner surface of the valve casing. The valve casing and the seal ring are made of a rubber-like polymer elastic body, a first port is connected to communicate with the valve chamber, and a second port is connected to communicate with an inner side of the valve seat. At actuation of the solenoid, when the stem moves in an axial direction, the seal ring follows the movement by only elastic deformation without sliding.

9 Claims, 10 Drawing Sheets

(51) Int. Cl.
  *F16K 31/06* (2006.01)
  *F16K 1/42* (2006.01)
  *F16K 27/02* (2006.01)

(52) U.S. Cl.
  CPC ........ *F16K 27/029* (2013.01); *F16K 27/0263* (2013.01); *F16K 31/0627* (2013.01); *B01L 2200/0689* (2013.01); *B01L 2300/123* (2013.01); *B01L 2400/0622* (2013.01); *B01L 2400/0666* (2013.01); *Y10T 137/8667* (2015.04)

(58) Field of Classification Search
  CPC ..... B01L 2400/0622; B01L 2400/0666; B01L 3/567; F16K 11/044; F16K 1/44; F16K 31/0627; F16K 1/42; F16K 27/0263; F16K 27/029
  USPC .................................. 137/625.25–625.69
  See application file for complete search history.

(56) References Cited

U.S. PATENT DOCUMENTS

| | | | | |
|---|---|---|---|---|
| 4,605,196 | A | * | 8/1986 | Moffat ................ F16K 31/0627 137/625.27 |
| 4,611,631 | A | * | 9/1986 | Kosugi ................ F16K 31/0627 137/625.27 |
| 4,915,134 | A | * | 4/1990 | Toliusis ................ F16K 11/044 137/625.27 |
| 5,971,022 | A | * | 10/1999 | Hayashi ................ F16K 11/0712 137/625.64 |
| 6,488,050 | B1 | * | 12/2002 | Jabcon ................ F15B 13/0405 137/625.27 |

FOREIGN PATENT DOCUMENTS

| | | |
|---|---|---|
| JP | 4-111972 U | 9/1992 |
| JP | 2008-256090 A | 10/2008 |
| JP | 2009-257438 A | 11/2009 |

* cited by examiner

SMALL SOLENOID VALVE

BACKGROUND OF THE INVENTION

1. Field of the Invention

The present invention relates to a small solenoid valve to be used in various types of analysis and testing equipment, etc., for opening and closing or switching flow paths of a medical liquid, a sample liquid, etc., and specifically, to a small solenoid valve that can be further downsized to realize lower power consumption.

2. Description of Related Art

In blood analysis equipment, water quality analysis equipment, and exhaust gas testing equipment, normally, solenoid-driven diaphragm valves are used as small solenoid valves for opening and closing or switching flow paths of a medical liquid, a sample liquid, etc.

This type of solenoid valve that opens and closes a flow path of a medical liquid, a sample liquid, or the like, has been known by JP2009-257438 A. In this solenoid valve, a highly chemical resistant material is used for liquid contact portions such as a valve chamber and a valve body in order to minimize the effect on the medical liquid or the like, and a diaphragm valve is arranged in order to prevent the medical liquid or sample liquid from flowing into the side of a solenoid chamber, which provides a structure in which the valve chamber is isolated from the solenoid chamber side by the diaphragm.

However, because this conventional type of diaphragm solenoid valve has a large pressure receiving area in the diaphragm because of the structure of the diaphragm, when a liquid pressure in the valve chamber or a liquid pressure from the side of a port is applied to the diaphragm, the diaphragm valve body in a non-biased state may move against a spring force to maintain that state, so that there is a possibility that the valve may unexpectedly open or close.

Therefore, in the solenoid valve using a diaphragm valve having a large pressure receiving area, it is necessary for maintaining the non-biased state to provide a strong spring force of a coil spring or the like to press the diaphragm valve to an opening or closing side.

Also, the coil spring or the like is thereby increased in size, and a solenoid serving as a drive source of the solenoid valve cannot help but be increased in size to make the diaphragm valve actuate against the spring force for maintaining a non-biased state, in which there has been a problem that downsizing of the solenoid valve is hindered.

SUMMARY OF THE INVENTION

It is an object of the present invention to provide a small solenoid valve that can be further downsized to achieve lower power consumption.

The object of the present invention can be achieved by a small solenoid valve configured as in the following.

That is, a small solenoid valve of the present invention includes a valve casing provided inside with a valve chamber, a stem which is coupled to a solenoid plunger of a solenoid, and is inserted into a shaft hole provided in the valve casing, a valve body attached to a distal end of the stem, a circular ring-shaped valve seat which is provided in the valve chamber of the valve casing, and on which the valve body is seated, a seal ring made of a rubber-like elastic body located between the valve chamber and the solenoid plunger, and externally fitted to the stem with an outer peripheral portion thereof made to contact with an inner surface of the shaft hole, a first port connected to communicate with the valve chamber, and a second port connected to communicate with an inner side of the valve seat.

Further, the small solenoid valve of the present invention is configured such that, at actuation of the solenoid, when the stem moves in an axial direction, the seal ring follows the movement by only elastic deformation without sliding, and when the valve body is seated on the valve seat, the valve chamber and the second port are disconnected from each other, and when the valve body separates from the valve seat, the first port and said second port communicate with each other.

According to the present invention, a small solenoid valve serving as a two-way valve that opens or disconnects the first port and the second port from each other can be configured, it is not necessary to provide a diaphragm for the valve body, and opening and closing and switching of the ports is performed using the valve body without a diaphragm. Therefore, the valve body can be reduced in pressure receiving area, which allows reducing the spring force of a spring to maintain the valve body in a non-biased state (non-actuated state) to downsize the solenoid so as to achieve downsizing of the solenoid valve as a whole. Further, because the valve body having a small pressure receiving area is used, at the time of opening and closing or switching actuation of the valve, a pumping phenomenon in which a liquid in the valve chamber is discharged or sucked can be prevented, so that the accuracy of analysis by analysis equipment and the like can be improved, and dripping of a medical liquid, a sample liquid, or the like can be prevented.

Also, at the time of actuation, because the seal ring that provides sealing between the valve chamber side and the solenoid side does not slide but is only elastically deformed, the driving force necessary for moving the stem becomes considerably smaller to allow downsizing of the solenoid as well as further downsizing of the solenoid valve itself, which allows a reduction in power consumption thereof.

Also, another small solenoid valve of the present invention includes a valve casing provided inside with a first valve chamber and a second valve chamber, a stem which is coupled to a solenoid plunger of a solenoid, and is inserted into a shaft hole provided in the valve casing, a valve body attached to a distal end of the stem, a circular ring-shaped first valve seat which is provided inside the first valve chamber of the valve casing, and on which the valve body is seated, a circular ring-shaped second valve seat which is provided between the first valve chamber and the second valve chamber of the valve casing, and on which the valve body is seated, a seal ring made of a rubber-like elastic body located between the second valve chamber and the solenoid plunger, and externally fitted to the stem with an outer peripheral portion thereof made to contact with an inner surface of the shaft hole, a first port connected to communicate with the first valve chamber, a second port connected to communicate with an inner side of the first valve seat, and a third port connected to communicate with the second valve chamber.

Further, the present small solenoid valve is configured such that, at actuation of the solenoid, when the stem moves in an axial direction, the seal ring follows the movement by only elastic deformation without sliding, and when the valve body is seated on the first valve seat, the first valve chamber and the second valve chamber communicate with each other to disconnect the first port and the second port from each other and communicate the first port and the third port with each other, and when the valve body is seated on the second valve seat, the first port and the third port are disconnected from each other and the first port and the second port communicate with each other.

According to the small solenoid valve of the present invention, a small solenoid valve serving as a three-way switching valve that uses the above-described first port as a common port and connects the above-described second port or the above-described third port by switching with respect to the first port can be configured, and the valve body has a smaller pressure receiving area, so that the spring force of a spring to maintain the valve body in a non-biased state at the time of non-energization can be reduced to downsize the solenoid so as to achieve downsizing of the solenoid valve as a whole.

Further, because the valve body having a small pressure receiving area is used, at the time of opening and closing or switching actuation of the valve, a pumping phenomenon in which a liquid in the valve chamber is discharged or sucked can be prevented, so that the accuracy of analysis by analysis equipment and the like can be improved, and dripping of a medical liquid, a sample liquid, or the like can be prevented.

Further, because an outer peripheral surface of the seal ring fitted by insertion on the outer periphery of the stem is only brought into sliding contact with the inside of the second valve chamber, the seal ring has a minimum pressure receiving area, which reduces an actuating force of the solenoid to make it possible to downsize the solenoid and the solenoid valve as a whole, allowing a reduction in power consumption.

Here, the above-described small solenoid valve may be configured such that the first port is provided as a common port, the second port is provided as a normally closed port, and the third port is provided as a normally open port, a coil spring to bias the valve body toward the first valve seat is mounted on the solenoid plunger, and at energization of the solenoid, the valve body moves against a biasing force of the coil spring, the valve body separates from the first valve seat to be seated on the second valve seat, the second port communicates with the common port, and the third port is closed, so that the valve is switched.

Also here, in the above-described small solenoid valve, by blocking the third port, said small solenoid valve may be configured as a two-way valve of a normally closed type in which the first port is provided as a common port and the second port is provided as a normally closed port, and in this case, at energization of the solenoid, the valve body moves against a biasing force of the coil spring, and separates from the first valve seat to abut against the second valve seat, and said second port communicates with the common port.

Also here, in the above-described small solenoid valve, by blocking the second port, the small solenoid valve may be configured as a two-way valve of a normally open type in which the first port is provided as a common port and the third port is provided as a normally open port, and at energization of the solenoid, the valve body moves against a biasing force of the coil spring, and separates from the first valve seat to abut against the second valve seat, and the first port and the third port are disconnected from each other.

Also here, the above-described small solenoid valve may be configured such that the valve casing is divided into two to be made up of a 1st valve case and a 2nd valve case, the 1st valve case is fixed to an end portion of the solenoid, the 2nd valve case is fixed to an end portion of the 1st valve case, the 2nd valve case is provided with the first port, the second port, and the third port, the first valve chamber is formed in the 2nd valve case of a junction portion between the 1st valve case and the 2nd valve case, the second valve chamber is formed in the 1st valve case, the first valve seat is provided on the 2nd valve case, the second valve seat is provided on the 1st valve case, the valve body is disposed in the first valve chamber between the first valve seat and the second valve seat, and a sheet-like sealing member is interposed for insertion between the 1st valve case and the 2nd valve case in a form of surrounding a periphery of the first valve chamber.

Also here, it is preferable that, in the above-described 1st valve case, a communication passage that communicates with the third port in the 2nd valve case is formed in communication with the second valve chamber, the third port is formed parallel to an axial direction of the stem in the 2nd valve case, the communication passage is formed in the 1st valve case in a direction perpendicular to the axial direction of the stem, a connecting portion between the communication passage and the third port is connected by an inclined joint surface of the 1st valve case and the 2nd valve case, and the inclined joint surface is formed at an inclination angle of approximately 45° with respect to the axial direction of the stem.

According thereto, the communication passage to communicate with the second valve chamber in the 1st valve case can be formed perpendicular to the axial direction to achieve simplification of the die structure and ease of mold release when the valve casing is molded, and further, the valve casing can be minimized in height to achieve downsizing of the solenoid valve.

Also here, the above-described sheet-like sealing member may be arranged along the inclined joint surface between the 1st valve case and the 2nd valve case, and in the sheet-like sealing member, a communication hole to communicate with the third port and the communication passage may be formed.

Also here, it is preferable that the sheet-like sealing member is integrally molded in a state where a second flat portion located on the inclined joint surface is inclined with respect to a first flat portion located in the first valve chamber. According thereto, only a single sheet-like sealing member can reliably seal between the 1st valve case and the 2nd valve case.

Also here, the above-described second valve chamber may be configured so as to be formed in a shaft hole around the stem.

Also here, for the above-described seal ring, an O-ring may be used, and the O-ring may be fitted into an annular groove provided on an outer peripheral portion of the stem.

Also here, it is preferable that the above-described valve casing is molded from a synthetic resin material having a high chemical resistance, and the valve body and the seal ring are molded of a polymer elastic body having a high chemical resistance.

As above, according to the small solenoid valve of the present invention, further downsizing becomes possible, lower power consumption can be achieved, and a pumping phenomenon at the time of opening and closing actuation or the time of switching actuation can be prevented.

DESCRIPTION OF THE PREFERRED EMBODIMENTS

Hereinafter, the present invention will be described based on embodiments shown in the drawings. However, the present invention is by no means limited to the embodiments. Any modifications within the requirements of the claims or equivalents relating to the requirements should be included in the scope of the claims. The small solenoid valve in FIG. 1 to FIG. 10 shows a solenoid valve as a small three-way switching valve to be used in various types of analysis and testing equipment so as to switch flow paths of a medical liquid, a sample liquid, etc.

Figure 1:
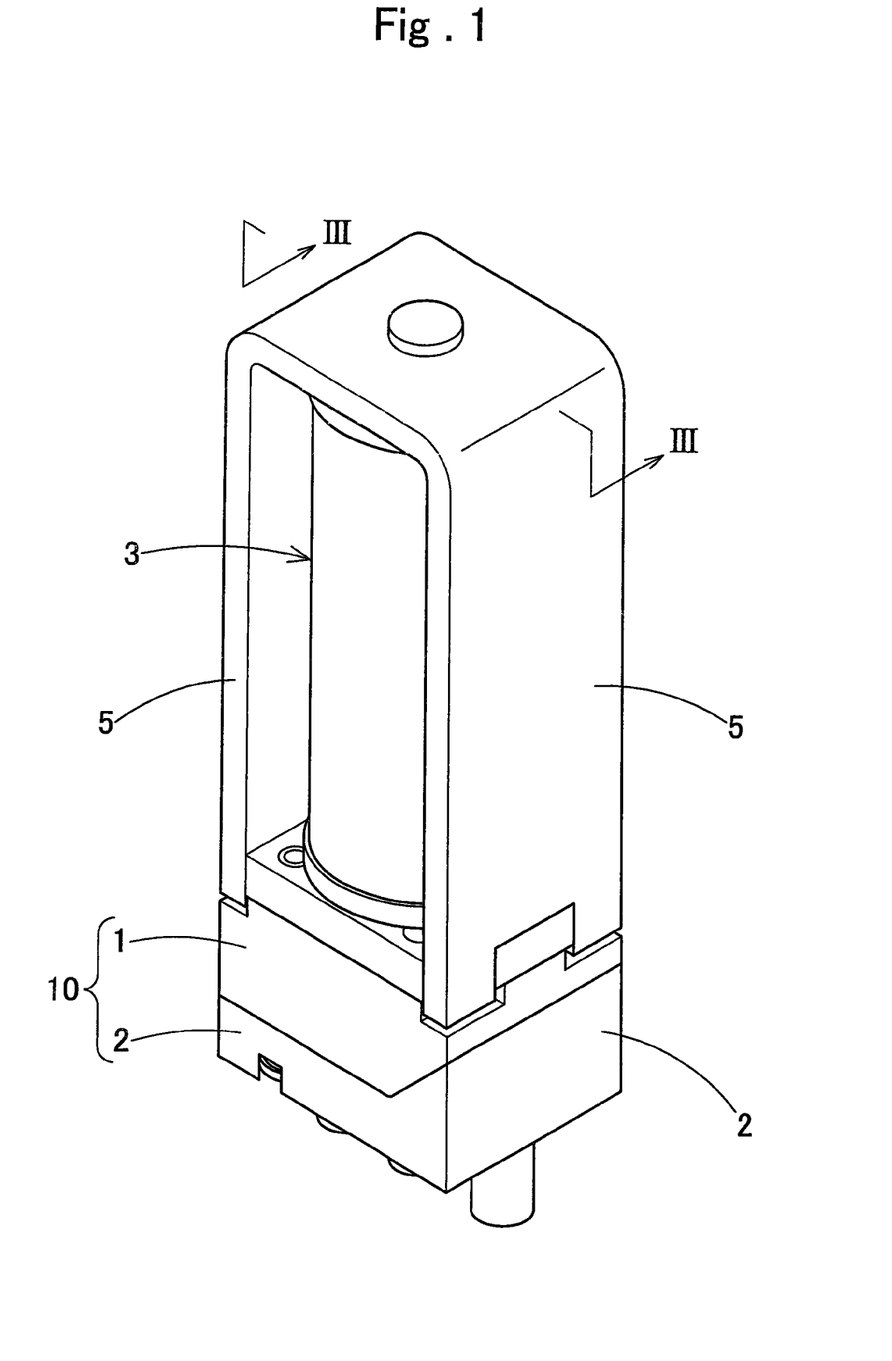
FIG. 1 is a perspective view of a small solenoid valve showing an embodiment of the present invention.
Figure 2:
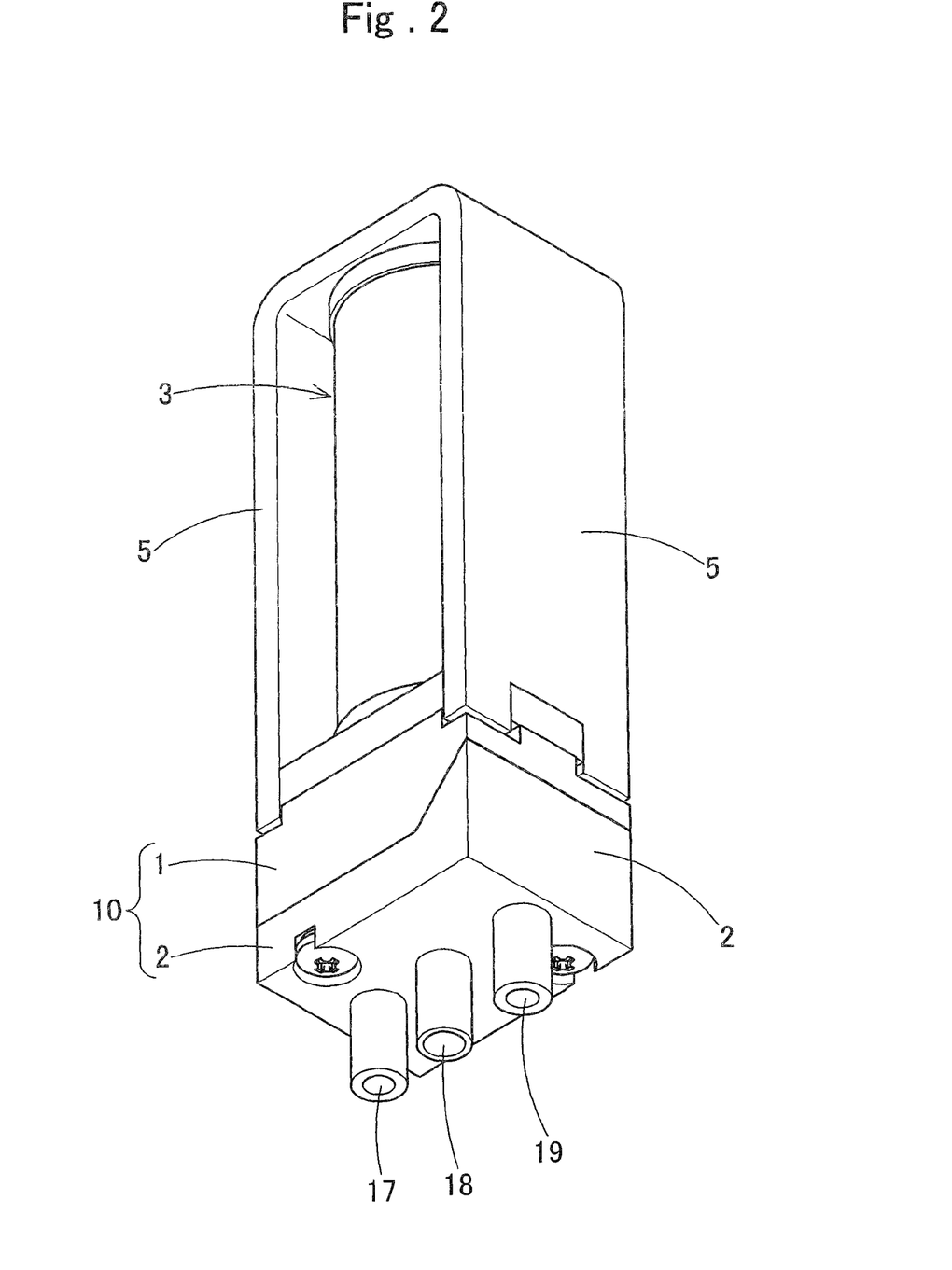
FIG. 2 is a perspective view of the same small solenoid valve, viewed from below.
Figure 3:
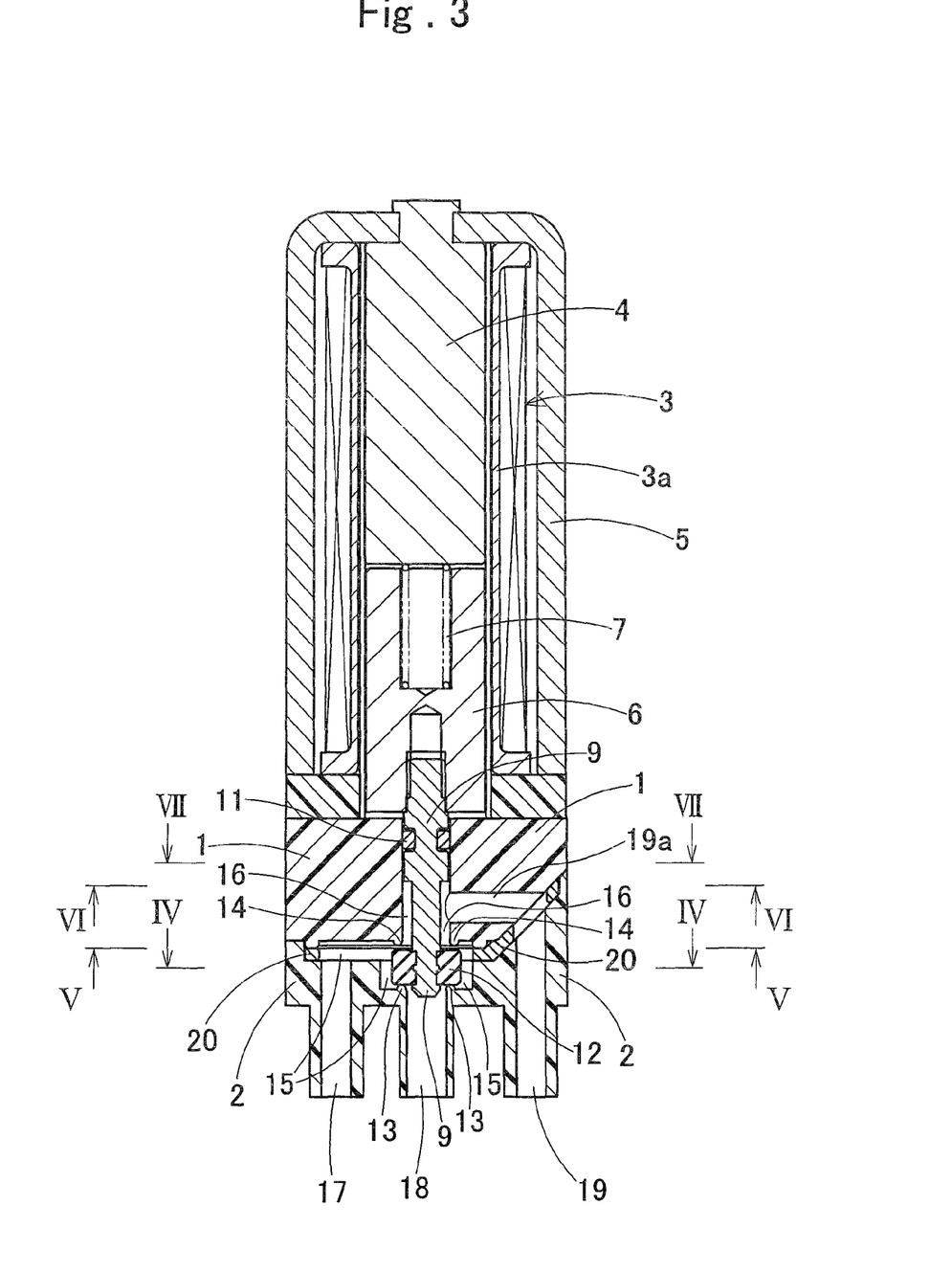
FIG. 3 is a sectional view taken along III-III in FIG. 1.
Figure 4:
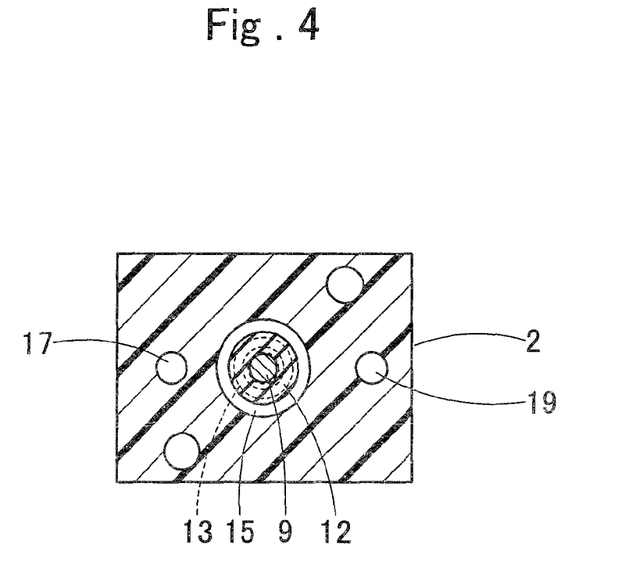
FIG. 4 is a sectional view taken along IV-IV in FIG. 3.
Figure 5:
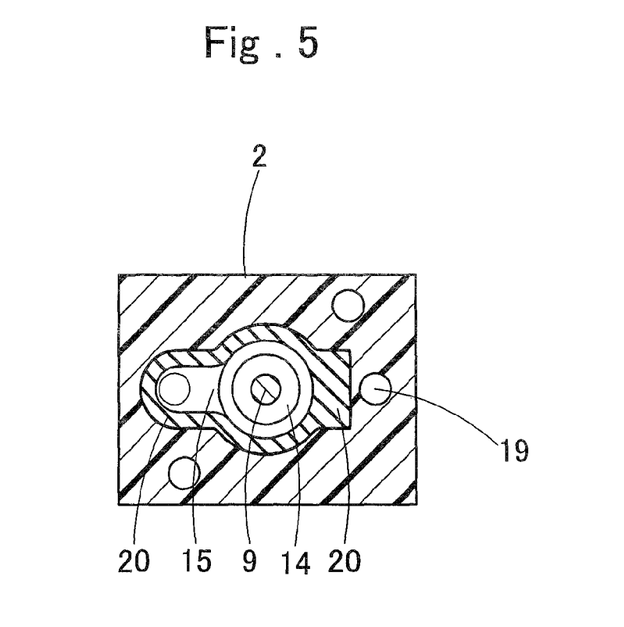
FIG. 5 is a sectional view taken along V-V in FIG. 3.
Figure 6:
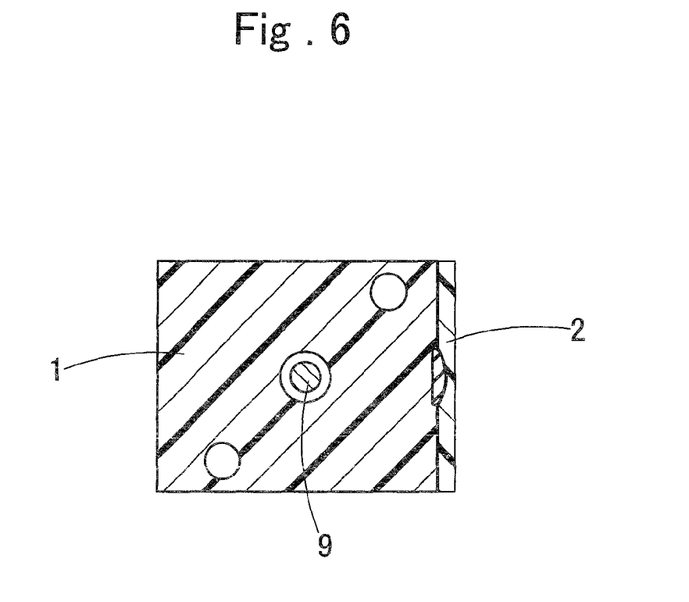
FIG. 6 is a sectional view taken along VI-VI in FIG. 3.
Figure 7:
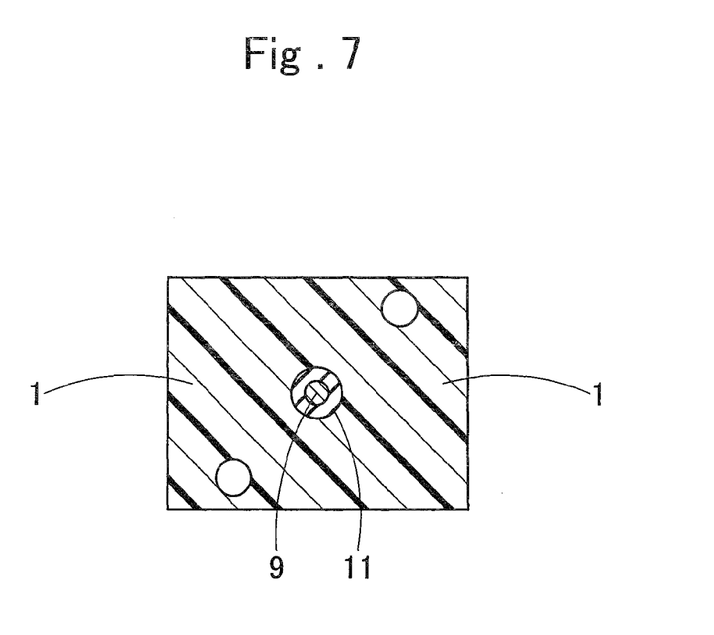
FIG. 7 is a sectional view taken along VII-VII in FIG. 3.

This small solenoid valve has a structure, as shown in FIG. 3, by a stem 9 being coupled to a solenoid plunger 6 of a solenoid 3, a valve body 12 being attached to a distal end of the stem 9, a first valve chamber 15 and a second valve chamber 16 being provided in a valve casing 10 made up of a 1st valve case 1 and a 2nd valve case 2, a first port 17, a second port 18, and a third port 19 being formed in the 2nd valve case 2, and the stem 9 and the valve body 12 being moved in an axial direction by the solenoid 3, for connecting by switching the second port 18 and the third port 19 with respect to the first port 17 to serve as a common port. The first port 17 serves as a common port, the second port 18 serves as a normally closed port, and the third port 19 serves as a normally open port.

The solenoid 3 to serve as a drive unit is constructed by winding a coil around a bobbin 3a, a core 4 being inserted inside the bobbin 3a, and mounting a side core 5 on both sides of the solenoid 3. A space is provided under the core 4 in the solenoid 3, and into the space, the solenoid plunger 6 is inserted so as to be movable up and down via a coil spring 7. The solenoid plunger 6 is, in a normal state, biased in a direction to project downward by a biasing force of the coil spring 7, and at the time of energization of the solenoid 3, sucked upward against the biasing force of the coil spring 7 to move in the axial direction at a slight stroke length.

Figure 8:
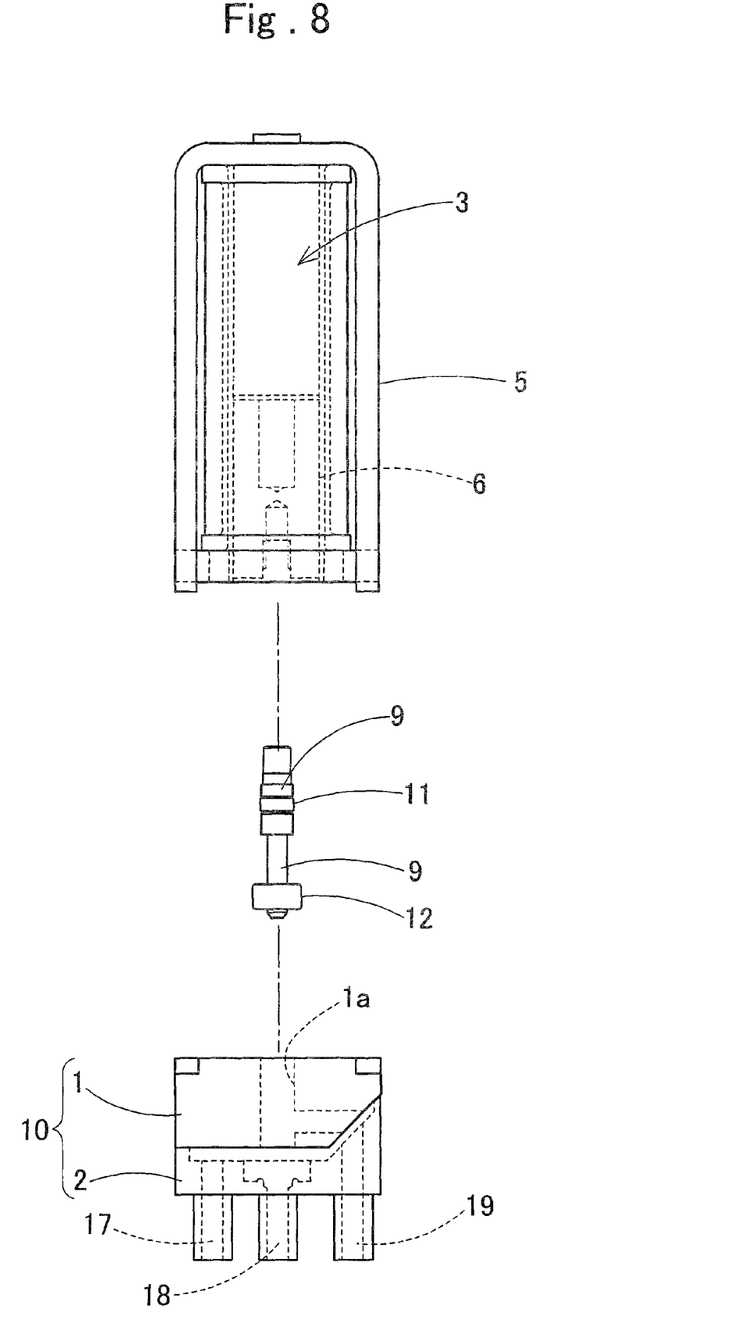
FIG. 8 is an exploded front view in a state where a 1st valve case, a 2nd valve case, and a stem assembly are removed.
Figure 9:
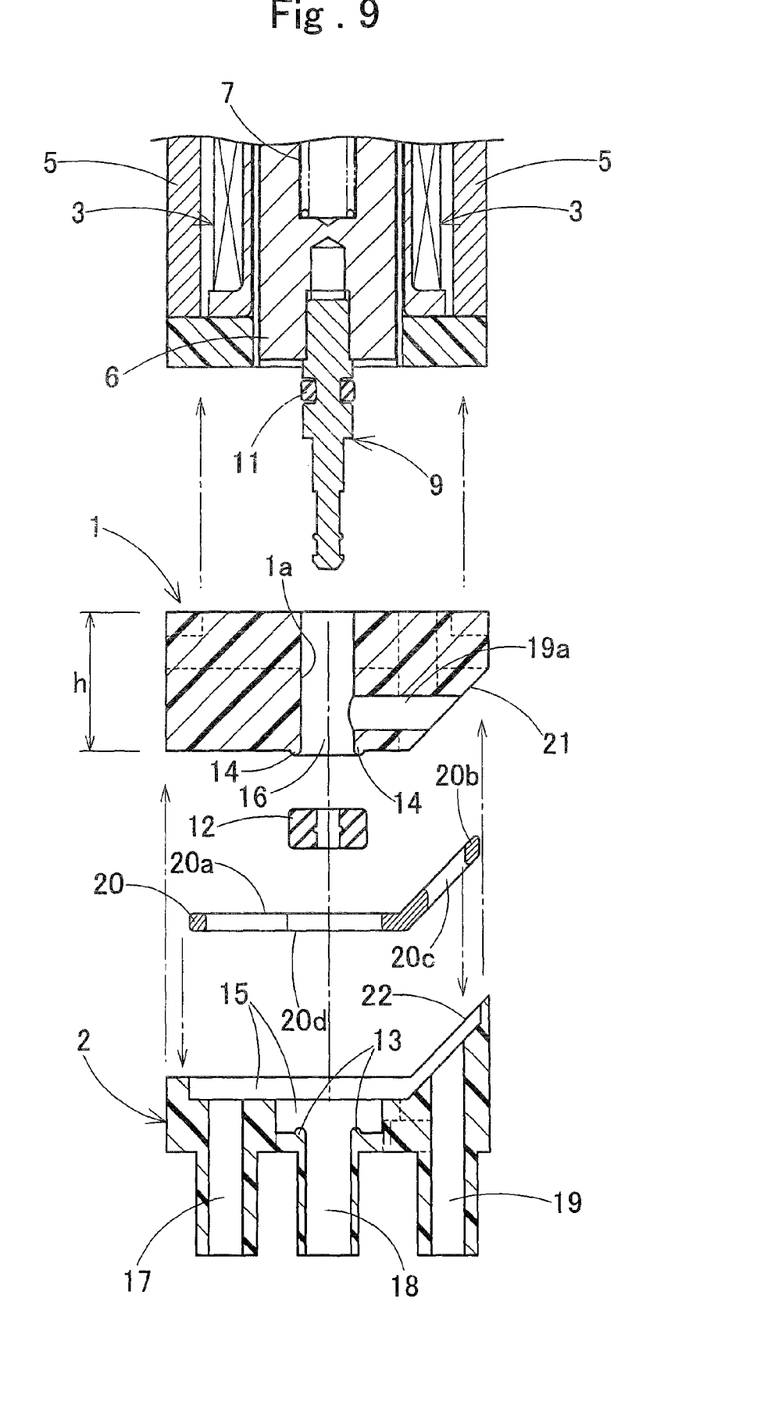
FIG. 9 is an exploded sectional view in a state where a 1st valve case, a 2nd valve case, and a sheet-like sealing member are removed.

The stem 9 holding the valve body 12 is, as shown in FIG. 8 and FIG. 9, screwed into a screw hole provided in a lower portion of the solenoid plunger 6, and is attached facing downward on a central axis. An annular groove is formed on an outer periphery of a middle portion of the stem 9, and into the annular groove, a seal ring 11 is fitted by insertion. For the seal ring 11, an O-ring made of a rubber-like elastic body is used. The O-ring has excellent seal performance as well as high chemical resistance and corrosion resistance, is not affected by a medical liquid, a sample liquid, etc., and does not adversely affect the medical liquid or sample liquid. For the seal ring 11, not only an O-ring but also an X-ring, a Y-packing, etc., can be used, and thus using a ready-made sealing member allows manufacturing at low cost as compared with when a dedicated sealing member is specially manufactured.

Also, at the time of switching actuation of the valve, that is, when the stem 9 moves up and down, the movement is performed within an elasticity range of the seal ring 11 and the seal ring 11 is only elastically deformed, the seal ring 11 does not move, and therefore, there are few pumping phenomena. Further, the seal ring 11 is, as in FIG. 3, externally fitted into the annular groove on the outer periphery of the middle portion of the stem 9, an outer peripheral surface of the seal ring 11 only abuts against an inner peripheral surface of the second valve chamber 16, and therefore, the seal ring 11 to which pressure of the second valve chamber 16 is applied has a minimum pressure receiving area. Therefore, a driving force of the solenoid 3 to move the stem 9 up and down can be minimized, which allows downsizing of the solenoid 3 and a reduction in power consumption.

As shown in FIG. 3, the second chamber 16 is formed on an outer peripheral portion of the stem 9 under the valve body 12 with the stem 9 inserted in a shaft hole 1a of the 1st valve case 1. Further, to a distal end (lower end) portion of the stem 9, as shown in FIG. 8 and FIG. 9, the valve body 12 is attached. The valve body 12 is formed in a columnar shape using a rubber-like elastic body.

In addition, the valve body 12 may be in a shape such as a rectangular parallelepiped shape as long as being in a shape in which the valve body 12 can be externally fitted to the stem 9 and can abut against a first valve seat 13 and a second valve seat 14. The valve body 12 is provided in a center thereof with a shaft hole, and attached with the distal end portion of the stem 9 fitted by insertion into the shaft hole. The valve body 12 has a structure in which, as shown in FIG. 3, the valve body 12 moves between the first valve seat 13 of the second port 18 on the 2nd valve case 2 side and the second valve seat 14 on the 1st valve case 1 side over the first valve seat 13, and is alternately seated at the time of switching actuation of the valve by the solenoid 3.

As above, the valve casing 10 is divided into two to be made up of the 1st valve case 1 and the 2nd valve case 2. The 1st valve case 1 and the 2nd valve case 2 of the valve casing 10 and the stem 9 are respectively molded from a synthetic resin material having a high chemical resistance, and the valve body 12 and the seal ring 11 are also molded from a polymer elastic body having a high chemical resistance, so as to prevent corrosion and chemical changes of inner members due to various types of medical or sample liquids. The 1st valve case 1 that defines an upper portion of the valve casing 10 is, as shown in FIG. 3, formed at its upper surface in a form of being fixed to an end portion of the solenoid 3, and is, as shown in FIG. 8 and FIG. 9, formed with the shaft hole 1a in a central axis direction. When the above-described solenoid 3 is attached to an upper portion of the 1st valve case 1, the stem 9 at a lower end of the solenoid plunger 6 enters into the shaft hole 1a and the seal ring 11 is also inserted into the shaft hole 1a, and in this state, the solenoid plunger 6 becomes slidable up and down at a slight stroke length. Also, the stem 9 and the seal ring 11 are also fitted by insertion into the shaft hole 1a so as to be slidable at a slight stroke length. The seal ring 11 mounted on the outer periphery of the middle portion of the stem 9 is thereby inserted inside the shaft hole 1a of the 1st valve case 1 to reach a state of sealing an inner surface of the shaft hole 1a.

Also, as shown in FIG. 9, the ring-shaped second valve seat 14 is provided on a peripheral edge portion at a lower side of the shaft hole 1a in the 1st valve case 1, and at the time of energization of the solenoid 3, an upper surface of the valve body 12 abuts against the second valve seat 14 when the stem 9 slightly rises, and the second valve chamber 16 on the outer periphery of the stem 9 is thereby closed.

As above, inside the shaft hole 1a, the second valve chamber 16 is formed around the stem 9, but the seal ring 11 is fitted into a circumferential groove on an outer peripheral portion of the stem 9, so that the pressure receiving area of the stem 9 including the seal ring 11 is very small, and when a liquid pressure is applied to the second valve chamber 16 through the first valve chamber 15 from the first port 17, the stem 9 does not move in a valve opening direction.

Therefore, the coil spring 7 that biases the stem 9 in the valve opening direction of the valve body 12 can be reduced in spring force, and the solenoid 3 can also be reduced in biasing force at the time of actuation. It thus becomes possible to downsize the solenoid 3 in shape as well, thereby enabling downsizing of the solenoid valve as a whole.

On the other hand, a communication passage 19a to communicate with the third port 19 in the 2nd valve case 2 is formed in communication with the second valve chamber 16. The communication passage 19a is formed in a direction perpendicular to the axial direction of the stem 9 and within the 1st valve case 1, and as shown in FIG. 9, the communication passage 19a is formed so as to open in an inclined joint surface 21 of the 1st valve case 1.

That is, a lower surface of the 1st valve case 1 is provided as a horizontal plane that is transversally horizontal at the site of the second valve seat 14, but is formed with the inclined joint surface 21 so as to incline at an end portion of the communication passage 19a, and the inclined joint surface 21 is assembled so as to join with an inclined joint surface 22 of an upper surface of the 2nd valve case 2. The inclined joint surface 21 is formed at an inclination angle of approximately 45° with respect to the axial direction of the stem 9. Similarly, the inclined joint surface 22 is formed at an inclination angle of approximately 45° with respect to the axial direction of the stem 9.

As a result of the communication passage 19a in the 1st valve case 1 being thus formed in a horizontal transverse direction perpendicular to the axial direction and its end portion opening in the inclined joint surface 21, the 1st valve case 1 can be formed with a short height dimension h (FIG. 9). Further, when the 1st valve case 1 is molded from a synthetic resin, mold release can be facilitated to simplify the mold in structure. The valve casing 10 including the 1st valve case 1 and the 2nd valve case 2 can thereby be downsized in height dimension, and molding in manufacturing can be easily performed. In addition, the inclination angle of the inclined joint surface 21 can take an arbitrary angle, other than 45°, as long as it is able to facilitate mold release when the valve casing 10 is molded to simplify the mold in structure.

Figure 10:
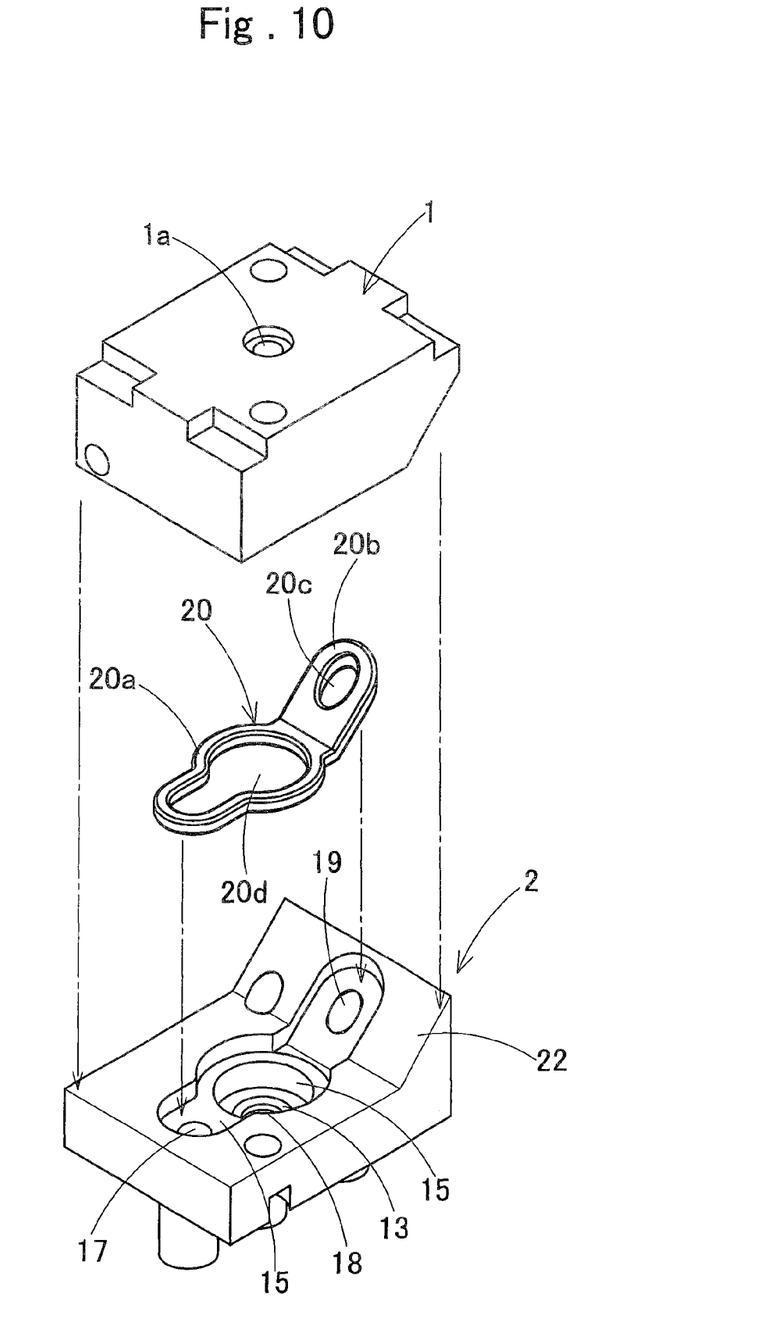
FIG. 10 is an exploded perspective view of the 1st valve case, the 2nd valve case, and the sheet-like sealing member.

Under the 1st valve case 1, as shown in FIG. 3, FIG. 9, and FIG. 10, the 2nd valve case 2 is fitted and fixed with a sheet-like sealing member 20 interposed for insertion. The 2nd valve case 2 that defines a lower portion of the valve casing 10 is formed, at its central upper surface, with the first valve chamber 15 as a circular recess portion, and is opened, in a center of the first valve chamber 15, with an upper portion of the second port 18. Also, in the first valve chamber 15, the ring-shaped first valve seat 13 is formed around the site where the upper portion of the second port 18 opens, which provides a structure in which the valve body 12 is seated on the first valve seat 13 with the above-described stem 9 lowered by the biasing force of the coil spring 7, so as to close the second port 18.

As shown in FIG. 10, on the upper surface of the 2nd valve case 2, an inclined portion provided with the inclined joint surface 22 to be joined with the inclined joint surface 21 on the lower surface of the 1st valve case 1 is provided, and in the upper surface of the 2nd valve case 2, a recess portion including the first valve chamber 15 is formed for insertion of the sheet-like sealing member 20 thereinto. Similar to the inclined joint surface 21 of the above-described 1st valve case 1, the inclined joint surface 22 of the inclined portion of the 2nd valve case 2 is formed at an inclination angle of approximately 45° with respect to the axial direction of the stem 9.

Joint surfaces of the 1st valve case 1 and the 2nd valve case 2 include, as described above, the inclined joint surface 21 and the inclined joint surface 22, and the inclined joint surfaces 21 and 22 of the 1st valve case 1 and the 2nd valve case 2 are provided to connect the communication passage 19a on the 1st valve case 1 side and the third port 19 on the 2nd valve case 2 side perpendicular to each other.

As above, by providing a structure in which the communication passage 19a and the third port 19 perpendicular to each other are connected by the inclined joint surfaces 21 and 22 of the 1st valve case 1 and the 2nd valve case 2, the communication passage 19a in the 1st valve case 1 is formed in a direction perpendicular to the axial direction to provide a higher moldability (such as ease of mold release) when the 1st valve case 1 is molded and the third port 19 in the 2nd valve case 2 is formed parallel to the axial direction to provide a higher moldability when the 2nd valve case 2 is molded. In addition, the inclination angle of the inclined joint surface 22 can take an arbitrary angle, other than 45°, as long as it is able to able to facilitate mold release when the valve casing 10 is molded to simplify the mold in structure.

Also, in the recess portion of the upper surface of the 2nd valve case 2, upper end portions of the first port 17, the second port 18, and the third port 19 are open, the first valve chamber 15 communicates with the first port 17, and peripheral edge portions are sealed by the sheet-like sealing member 20. Also, the third port 19 is sealed on its periphery in a disconnected manner by the sheet-like sealing member 20 with respect to the first valve chamber 15.

The sheet-like sealing member 20 is formed like a sheet of a rubber-like polymer elastic body, and as shown in FIG. 10, has a first flat portion 20a parallel to the horizontal traverse direction, and is provided with an opening portion 20d in a center of the first flat portion 20a. Also, a second flat portion 20b is integrally formed with an end portion of the first flat portion 20a in an inclined manner so as to be parallel to the inclined joint surface 22, and in the inclined second flat portion 20b, a communication hole 20c to communicate with the third port 19 is formed.

The joint surfaces of the 1st valve case 1 and the 2nd valve case 2 include the inclined joint surfaces 21 and 22, and the third port 19 and the communication passage 19a are connected by the inclined joint surface 21 and the inclined joint surface 22, and the connecting portion is sealed by a peripheral edge portion of the communicating hole 20c of the sheet-like sealing member 20. For the sheet-like sealing member 20, the first flat portion 20a and the second flat portion 20b that are similarly inclined are integrally formed. Therefore, the valve casing 10 can seal between the 1st valve case 1 and the 2nd valve case 2 only by interposing a single sealing member for insertion between the joint surfaces of the 1st valve case 1 and the 2nd valve case 2, and a higher assembling workability is also provided in manufacturing.

As above, within the 2nd valve case 2, the third port 19 is formed parallel to the axial direction of the stem 9, and the first port 17 and the second port 18 are also formed inside the second valve case 2 in a manner parallel to the third port 19, that is, in a manner parallel to the axial direction of the stem 9, and an upper end of the first port 17 communicates with the first valve chamber 15, and an upper end of the second port 18 communicates with an inner side of the first valve seat 13. All tube connecting portions of the first port 17, the second port 18, and the third port 19 reach a form of being provided in juxtaposition on a bottom surface of the 2nd valve case 2 being a lower portion of the valve casing 10 and facing in the same downward direction, which allows easily performing connection of tubes when connecting the respective tubes to the solenoid valve.

Although illustration is omitted, in the 1st valve case 1 and the 2nd valve case 2, a plurality of fixing holes communicating up to the solenoid 3 are provided in the axial direction, and the fixing holes open in a bottom portion of the 2nd valve case 2.

Therefore, when the valve casing 10 made up of the 1st valve case 1 and the 2nd valve case 2 is attached to a lower portion of the solenoid 3, as shown in FIG. 9, first, with an upper portion of the stem 9 fixed by screwing into the screw hole of the solenoid plunger 6, the 1st valve case 1 is fitted into a bottom portion of the 1st valve case 1 to insert the lower end of the stem 9 through the shaft hole 1a.

Next, the valve body 12 is externally fitted to the distal end portion of the stem 9 to fit the 2nd valve case 2 into the bottom portion of the 1st valve case 1 with the sheet-like sealing member 20 interposed for insertion. The solenoid valve is assembled in a manner of inserting fixing screws (not shown) into the fixing holes of the 2nd valve case 2 from below and screwing distal ends of the fixing screws into the fixing holes of the solenoid 3.

The small solenoid valve configured as described above is used as a solenoid valve to be used in various types of analysis and testing equipment, etc., for switching flow paths of a medical liquid, a sample liquid, etc. When the small solenoid valve configured as described above is used as a three-way switching valve, the first port 17 serves as a common port, the second port 18 serves as a normally closed port, the third port 19 servers as a normally open port, and the respective ports are connected with tubes for respective uses.

During OFF time where the solenoid 3 is not energized, the solenoid plunger 6 and the stem 9 are biased downward by the biasing force of the coil spring 7, so that the valve body 12 reaches a state of abutting against the first valve seat 13 to close the second port 18. On the other hand, because the valve body 12 and the second valve seat 14 thereover are separated to have a gap therebetween, the first valve chamber 15 communicates with the second valve chamber 16, and the first port 17 communicates with the third port 19 through the first valve chamber 15 and the second valve chamber 16. Accordingly, when the first port 17 and the second port 18 of the small solenoid valve are used as ports of a two-way valve, the two-way valve is a normally closed type, and when the first port 17 and the third port 19 of the small solenoid valve are used as ports of a two-way valve, the two-way valve is a normally open type.

When the solenoid 3 is energized to turn on the solenoid valve, the solenoid plunger 6 and the stem 9 are biased upward against the biasing force of the coil spring 7 to rise upward by a slight stroke length (for example, a few hundred micrometers). The valve body 12 at the distal end of the stem 9 accordingly rises, the valve body 12 separates from the first valve seat 13, and the second port 18 communicates with the first port 17. Simultaneously, the valve body 12 abuts against the second valve seat 14 to disconnect the first port 17 and the third port 19 from each other, and communicating connection of the first port 17 being a common port is thereby switched from the third port 19 to the second port 18.

When the energization of the solenoid 3 is turned off in this state, the solenoid plunger 6 and the stem 9 fall by a slight stroke length (for example, a few hundred micrometers) due to the biasing force of the coil spring 7. The valve body 12 at the distal end of the stem 9 accordingly falls, the valve body 12 separates from the second valve seat 14 to abut against the first valve seat 13 to disconnect the first port 17 and the second port 18 from each other, and the first port 17 is switched so as to communicate with the third port 19 through the first valve chamber 15 and the second valve chamber 16, so that the small solenoid valve operates as a three-way switching valve.

At the time of such actuation of the solenoid valve, the seal ring 11 is deformed within its elasticity range and does not slide on an inner circumferential surface of the shaft hole 1a. Therefore, no pumping phenomenon occurs, so that nozzle dripping and deterioration in analysis accuracy, etc., at the time of actuation of the solenoid valve can be prevented.

On the other hand, as described above, when the small solenoid valve is used as a two-way valve of a normally closed type, the third port 19 and the communication passage 19a are brought into a blocked state, and only the first port 17 and the second port 18 are used. In this case, when the solenoid 3 is energized to turn on the solenoid valve, the solenoid plunger 6 and the stem 9 are biased upward against the biasing force of the coil spring 7 to rise by a slight stroke length. The valve body 12 at the distal end of the stem 9 accordingly rises, the valve body 12 separates from the first valve seat 13, and the second port 18 communicates with the first port 17.

On the other hand, when the small solenoid valve is used as a two-way valve of a normally open type, the second port 18 is brought into a blocked state, and only the first port 17 and the third port 19 are used. In this case, the second port of the small solenoid valve of the present invention in the foregoing corresponds to the third port 19, and its valve seat corresponds to the second valve seat 14. When the solenoid 3 is energized to turn on the solenoid valve, the solenoid plunger 6 and the stem 9 are biased upward against the biasing force of the coil spring 7 to rise by a slight stroke length. The valve body 12 at the distal end of the stem 9 accordingly rises, the valve body 12 is seated on the second valve seat 14, and the third port 19 closes.

Because the seal ring 11 is thus fitted to the stem 9, a pumping phenomenon at the time of actuation can be prevented to improve the accuracy of analysis by analysis equipment and the like and prevent dripping of a medical liquid, a sample liquid, or the like. Also, at the time of actuation, because the seal ring 11 that provides sealing between the valve chamber side and the solenoid 3 side does not slide but is only elastically deformed within its elasticity range, the driving force necessary for moving the stem 9 becomes considerably smaller to allow downsizing of the solenoid 3 as well as further downsizing of the solenoid valve itself, which allows a reduction in power consumption thereof.

Although, in the above-described embodiment, the coil spring 7 that biases the solenoid plunger 6 downward is arranged inside of the solenoid plunger 6, a coil spring may be arranged outside of the solenoid plunger. In this case, because a part of the solenoid plunger is reduced in diameter to dispose the coil spring at an outer peripheral portion thereof, the solenoid plunger can have a narrow outer diameter, and the solenoid valve as a whole can also correspondingly have a narrow outer diameter.

Also, as described above, the small solenoid valve configured as described above serving as a three-way switching valve can be used as a two-way valve by blocking the third port 19 or the second port 18 thereof after manufacturing, but at the time of solenoid valve manufacturing, a small two-way solenoid valve can also be manufactured at low cost using the same design drawings and molds as those for a three-way switching valve.

Figure 11:
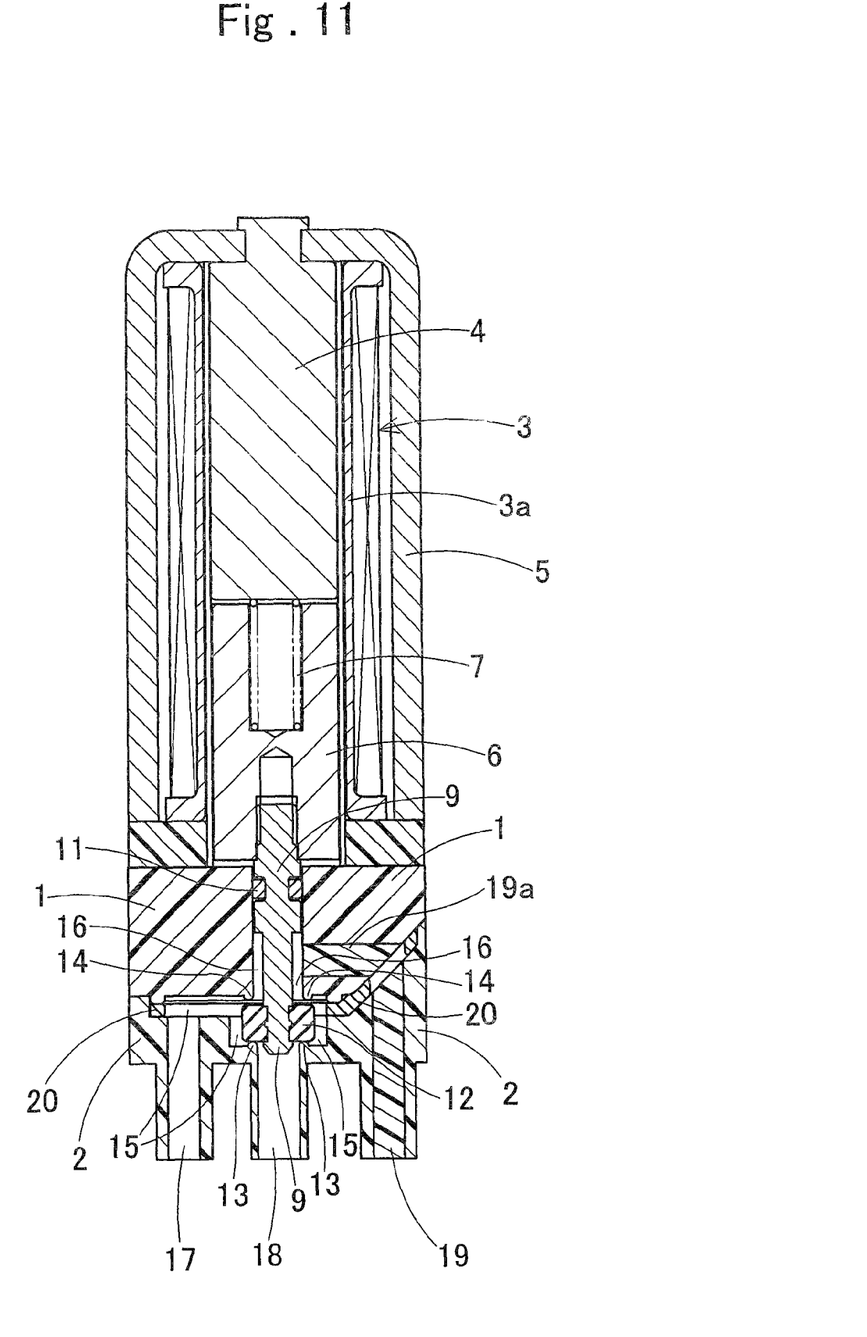
FIG. 11 is a sectional view of the embodiment provided as a two-way valve of a normally closed type.
Figure 12:
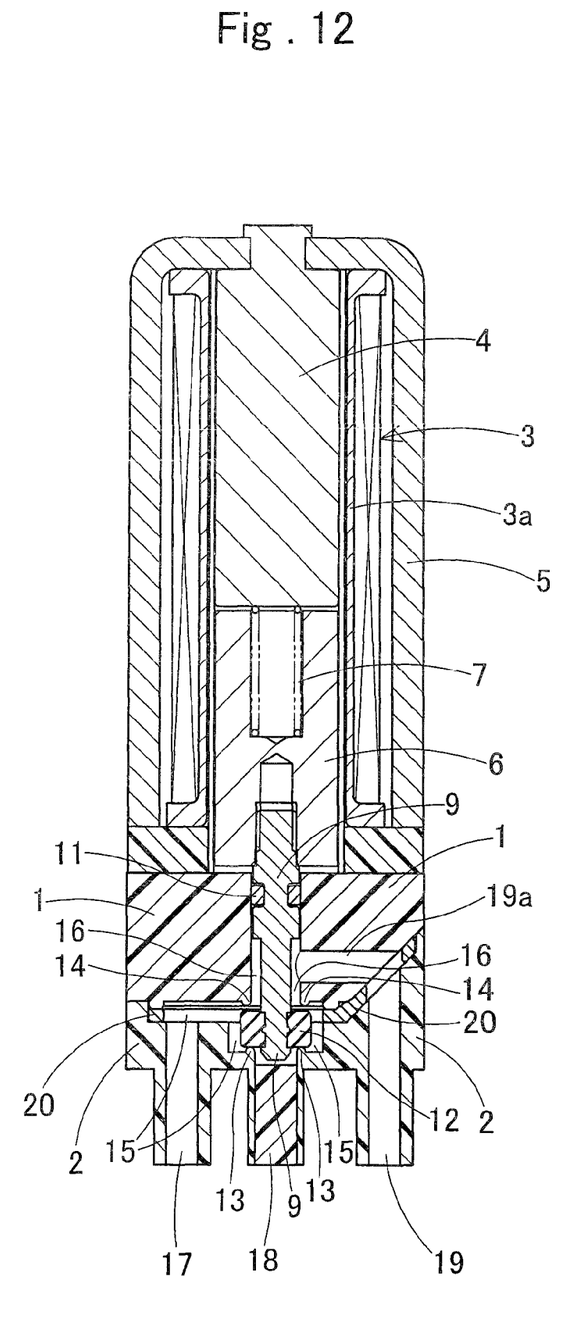
FIG. 12 is a sectional view of the embodiment provided as a two-way valve of a normally open type.

In this case, respective members can also be produced using the same design drawings and molds as those for a three-way switching valve to manufacture the small solenoid valve as a two-way valve by, as shown in FIG. 11, filling the third port 19 and the communication passage 19a with a synthetic resin material or the like for blocking in the case of a two-way valve of a normally closed type. On the other hand, in the case of a two-way valve of a normally open type, the small solenoid valve can also be manufactured as a two-way valve by, as shown in FIG. 12, filling the second port 18 with a synthetic resin material or the like for blocking.

Of course, a small solenoid valve being a two-way valve can also be produced by excluding, from the stage of design and manufacturing of a solenoid valve, the third port 19, the second port 18, the first valve seat 13 or the second valve seat 14, or the first valve chamber 15 or the second valve chamber 16 in the small solenoid valve configured as described above.

What is claimed is:

1. A small solenoid valve comprising:
   a valve casing provided inside with a first valve chamber and a second valve chamber;
   a stem which is coupled to a solenoid plunger of a solenoid, and is inserted into a shaft hole provided in said valve casing;
   a valve body attached to a distal end of said stem;
   a circular ring-shaped first valve seat which is provided inside said first valve chamber of said valve casing;
   a circular ring-shaped second valve seat which is provided between said first valve chamber and said second valve chamber of said valve casing;
   a seal ring made of a rubber-like elastic body located between said second valve chamber and said solenoid plunger, and externally fitted to said stem with an outer peripheral portion thereof made to contact with an inner surface of said shaft hole;
   a first port connected to communicate with said first valve chamber;
   a second port connected to communicate with an inner side of said first valve seat; and
   a third port connected to communicate with said second valve chamber, wherein
   the valve casing is divided into two to be made up of a 1st valve case and a 2nd valve case, said 1st valve case is fixed to an end portion of the solenoid, said 2nd valve case is fixed to an end portion of the 1st valve case, said 2nd valve case is provided with the first port, the second port, and the third port,
   the first valve chamber is formed in said 2nd valve case of a junction portion between said 1st valve case and said 2nd valve case, the second valve chamber is formed in said 1st valve case,
   in the 1st valve case, a communication passage that communicates with the third port in the 2nd valve case is formed in communication with the second valve chamber, said third port is formed parallel to the axial direction of the stem in said 2nd valve case, said communication passage is formed in said 1st valve case in a direction perpendicular to said axial direction of the stem, a connection portion between said communication passage and said third port is connected by an inclined joint surface of said 1st valve case and said 2nd valve case,
   the valve body is disposed in said first valve chamber between said first valve seat and said second valve seat, and a sheet-like sealing member is interposed for insertion between said 1st valve case and said 2nd valve case in a form of surrounding a periphery of said first valve chamber,
   at actuation of said solenoid, when said stem moves in an axial direction, said seal ring follows the movement by only elastic deformation without sliding, and when said valve body is seated on said first valve seat, said first valve chamber and said second valve chamber communicate with each other to disconnect said first port and said second port from each other and communicate said first port and said third port with each other, and when said valve body is seated on said second valve seat, said first port and said third port are disconnected from each other and said first port and said second port communicate with each other.

2. The small solenoid valve according to claim 1, wherein the first port is provided as a common port, the second port is provided as a normally closed port, and the third port is provided as a normally open port, a coil spring to bias the valve body toward the first valve seat is mounted on the solenoid plunger, and at energization of the solenoid, said valve body moves against a biasing force of said coil spring, said valve body separates from said first valve seat to be seated on said second valve seat, said second port communicates with said common port, and said third port is closed, so that the valve is switched.

3. The small solenoid valve according to claim 1, wherein said small solenoid valve is configured as a two-way valve of a normally closed type in which the third port is blocked, the first port is provided as a common port, and the second port is provided as a normally closed port, and at energization of the solenoid, the valve body moves against a biasing force of the coil spring, and separates from the first valve seat to abut against the second valve seat, and said second port communicates with said common port.

4. The small solenoid valve according to claim 1, wherein said small solenoid valve is configured as a two-way valve of a normally open type in which the second port is blocked, the first port is provided as a common port, and the third port is provided as a normally open port, and at energization of the solenoid, the valve body moves against a biasing force of the coil spring, and separates from the first valve seat to abut against the second valve seat, and said third port is closed.

5. The small solenoid valve according to claim 1, wherein the sheet-like sealing member is arranged along the inclined joint surface between the 1st valve case and the 2nd valve case, and in said sheet-like sealing member, a communication hole to communicate with the third port and the communication passage is formed.

6. The small solenoid valve according to claim 5, wherein the sheet-like sealing member is integrally molded in a state where a second flat portion located on the inclined joint surface is inclined with respect to a first flat portion located in the first valve chamber.

7. The small solenoid valve according to claim 1, wherein the second valve chamber is formed in the shaft hole around the stem.

8. The small solenoid valve according to claim 1, wherein an O-ring serving as the seal ring is fitted into an annular groove provided on an outer peripheral portion of the stem.

9. The small solenoid valve according to claim 1, wherein the valve casing is molded from a synthetic resin material having a high chemical resistance, and the valve body and the seal ring are molded of a polymer elastic body having a high chemical resistance.

* * * * *